(12) United States Patent
Haishima (10) Patent No.: US 7,466,921 B2
(45) Date of Patent: Dec. 16, 2008

(54) DROP-AND-CONTINUE DEVICE

(75) Inventor: Hatsumi Haishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 11/183,887

(22) Filed: Jul. 19, 2005

(65) Prior Publication Data

US 2006/0222363 A1    Oct. 5, 2006

(30) Foreign Application Priority Data

Mar. 31, 2005    (JP)    ............... 2005-104677

(51) Int. Cl.
*H04B 10/08* (2006.01)
*H04J 14/02* (2006.01)

(52) U.S. Cl. ............... 398/83; 398/82; 398/33
(58) Field of Classification Search ............. 398/30–33, 398/82, 83
See application file for complete search history.

(56) References Cited

U.S. PATENT DOCUMENTS

| | | | |
|---|---|---|---|
| 5,438,445 A | 8/1995 | Nakano | |
| 6,141,125 A * | 10/2000 | Blair et al. | ............... 398/32 |
| 6,307,654 B2 * | 10/2001 | Frigo | ............... 398/83 |
| 2004/0042795 A1 * | 3/2004 | Doerr et al. | ............... 398/83 |
| 2005/0191054 A1 * | 9/2005 | Aoki et al. | ............... 398/45 |

FOREIGN PATENT DOCUMENTS

| | | |
|---|---|---|
| JP | 4-167634 | 6/1992 |
| JP | 9-36834 | 2/1997 |
| JP | 2004-56685 | 2/2004 |

* cited by examiner

*Primary Examiner*—Dalzid Singh
(74) *Attorney, Agent, or Firm*—Staas & Halsey LLP

(57) ABSTRACT

Disclosed is a drop-and-continue device (84), provided between a signal converter (85) which supplies a signal to an end user and a wavelength-division multiplexing device (83) which comprises an optical demultiplexer (831) for separating an optical signal of a desired wavelength from an optical signal supplied from a head end station (82) and an optical multiplexer (832) for supplying an optical signal to a wavelength-division multiplexing device at a subsequent stage, comprising: an optical receiver (841) which converts the optical signal separated by the optical demultiplexer into an electrical signal; a transmitter (844) which transmits the electrical signal to the end user via the signal converter (85); an optical transmitter (845) which supplies an optical signal to the optical multiplexer (832); and a loopback processor (842) which loops the electrical signal output from the optical receiver back to the optical transmitter, thereby providing a drop-and-continue device that can easily add capabilities best suited for video, voice, and entertainment distribution and other added value features onto a WDM device.

3 Claims, 9 Drawing Sheets

DROP-AND-CONTINUE DEVICE

CROSS-REFERENCE TO RELATED APPLICATIONS

This application is based upon and claims the priority of Japanese Patent Application No. 2005-104677, filed Mar. 31, 2005, the contents being incorporated herein by reference.

BACKGROUND OF THE INVENTION

1. Field of the Invention

The present invention relates to a drop-and-continue device that can easily add capabilities best suited for video, voice, and entertainment distribution, and other added value features, onto a Dmux/Mux type wavelength-division multiplexing (WDM) device.

2. Description of the Related Art

Figure 1:
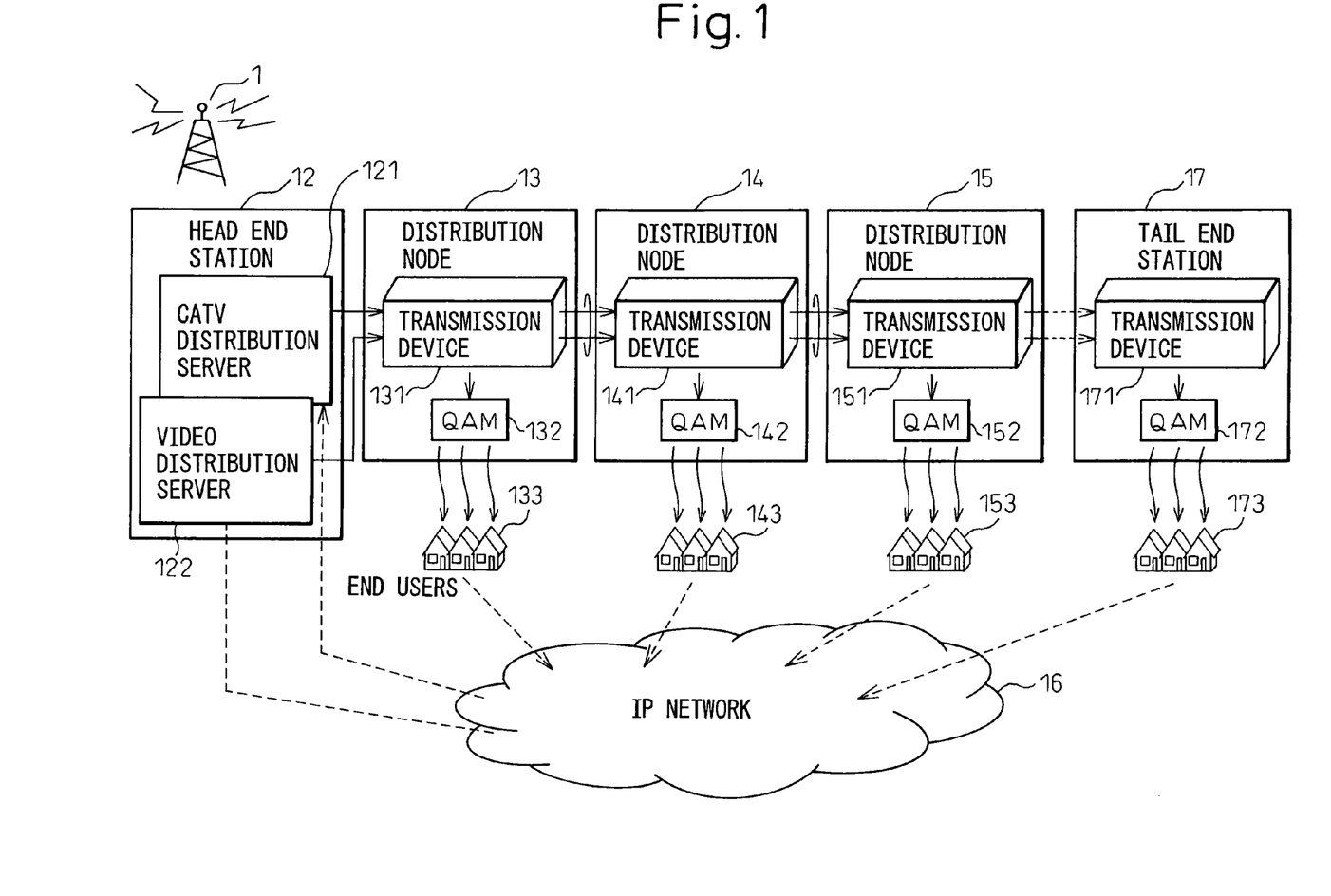
FIG. 1 is a diagram for explaining an overview of a cable television/video distribution network constructed to implement video, voice, and entertainment services provided by such entities as a cable television company or an MSO (Multiple Service Operator) that operates many cable television stations.

FIG. 1 is a diagram for explaining an overview of a cable television/video distribution network constructed to implement video, voice, and entertainment services provided by such entities as a cable television company or an MSO (Multiple Service Operator) that operates many cable television stations. In the figure, reference numeral 1 is an antenna of a television broadcasting station, 12 is a head end station, 13 to 15 are distribution nodes, 16 is an IP network, and 17 is a tail end station. The head end station 12 comprises a CATV distribution server 121, which receives radiowaves being radiated from the antenna 1 and transmits television signals to the distribution nodes 13 to 15 served by the head end, and a video distribution server 122, which transmits video signals to the IP network 16. The head end station 12 is, for example, an MSO (Multiple Service Operator) or a cable television company. The tail end station 17 is located at the terminal end of this distribution network.

Each distribution node, for example, the distribution node 13, comprises a transmission device 131, which transfers the incoming signal on to the next distribution node 14 or the tail end station and also to the end users 133 served by the distribution node 13, and a signal converter, for example, a quadrature amplitude modulator (QAM) 132, which converts the signal or data output from the transmission device 131 into a signal or data that can be used at the end user. The tail end station 17 also comprises a transmission device 171 and a quadrature amplitude modulator (QAM) 172.

The media (for example, television programs) to be provided to the end users are distributed from the CATV distribution server 121 in the head end station 12 to the end users via the respective distribution nodes. The media such as television programs distributed here are the same for all end users. Therefore, providing service of equal quality efficiently and simultaneously to all end users by a single distribution is of great importance to the MSO (Multiple Service Operator) or the cable television company.

Figure 2:
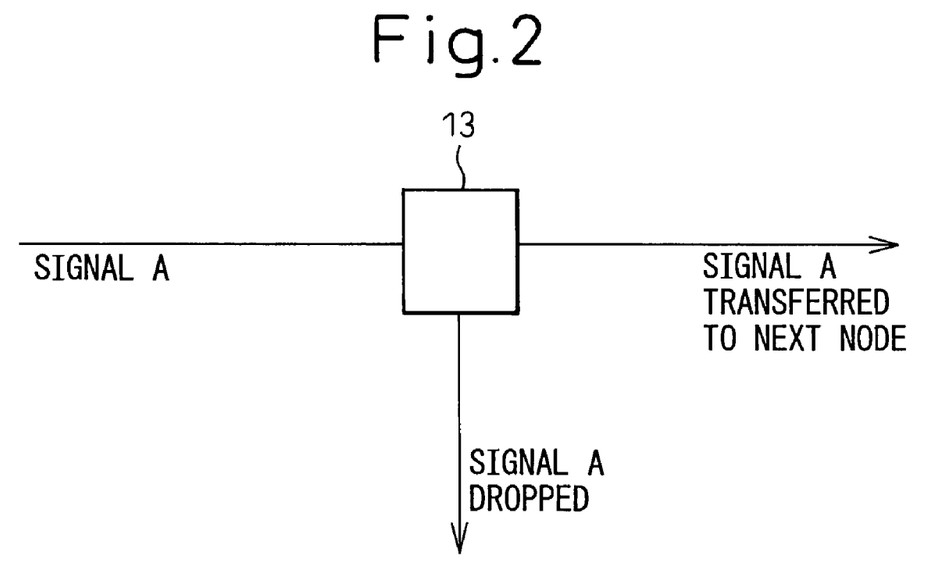
FIG. 2 is a diagram for explaining a drop-and-continue function that each distribution node should have.

FIG. 2 is a diagram for explaining the drop-and-continue function that each distribution node should have in order to provide the above service. As shown in the figure, it is strongly desired that the distribution node 13 be equipped with the drop-and-continue function that drops the received data A at the end user side and transfers the same data A to the next node.

Further, in such applications, data distribution from the end user side to the head end station or to the distribution node is quite unlikely (is not needed at all in the case of ordinary services but is only needed in the case of on-demand services recently put in operation), and it can therefore be said that the network is a one-way network. Accordingly, it is often practiced to save capital expenditures by using expensive backbone equipment only for service providing purposes and the IP network 16, etc. for data distribution from the end user side.

Figure 3:
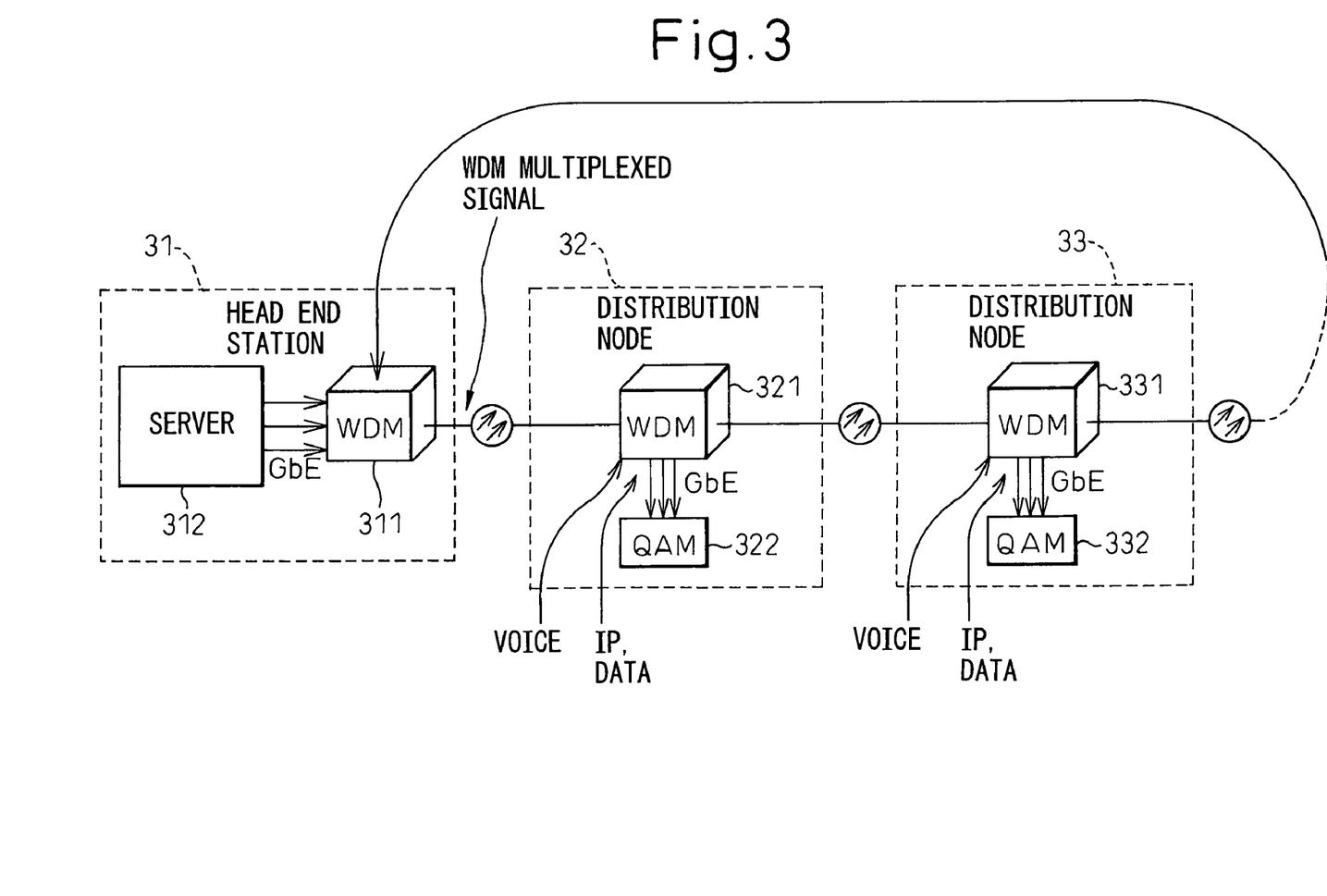
FIG. 3 is a block diagram showing the configuration of a cable television/video distribution network that uses metro WDM that has recently become a mainstream technology in order to implement the drop-and-continue function shown in FIG. 2.

FIG. 3 is a block diagram showing the configuration of a cable television/video distribution network that uses metro WDM, that has become a mainstream technology recently, in order to implement the drop-and-continue function shown in FIG. 2. In the figure, reference numeral 31 is a head end station comprising a WDM 311 and a server 312, and 32 is a WDM which transfers a WDM multiplexed signal received from the WDM 311 on to a quadrature amplitude modulator (QAM) 322 via a Gigabit Ethernet (registered trademark) (GbE). The distribution node 33 is identical in configuration to the distribution node 32. Data output from the distribution node 33 returns to the WDM 311 in the head end station via a number of distribution nodes.

Utilizing the transparency of the WDM that can multiplex any data, regardless of its content, at the optical level for transmission, the prior art system shown in FIG. 3 enables the backbone network to be shared among a plurality of applications such as voice (telephone) and data services, and thus aims to efficiently increase the variety of services that an MSO or a cable television company can offer.

This, however, has made it difficult to implement the drop-and-continue function which is crucial to the implementation of the originally intended distribution service. The drop-and-continue function can be implemented using an expensive WDM called a new generation WDM that incorporates a reconfigurable switch, but replacing the existing Mux/Dmux type WDM equipment with the expensive WDM is not realistic from the standpoint of cost. Accordingly, it is strongly desired to provide the distribution service efficiently while making use of the existing Mux/Dmux type WDM.

Figure 4:
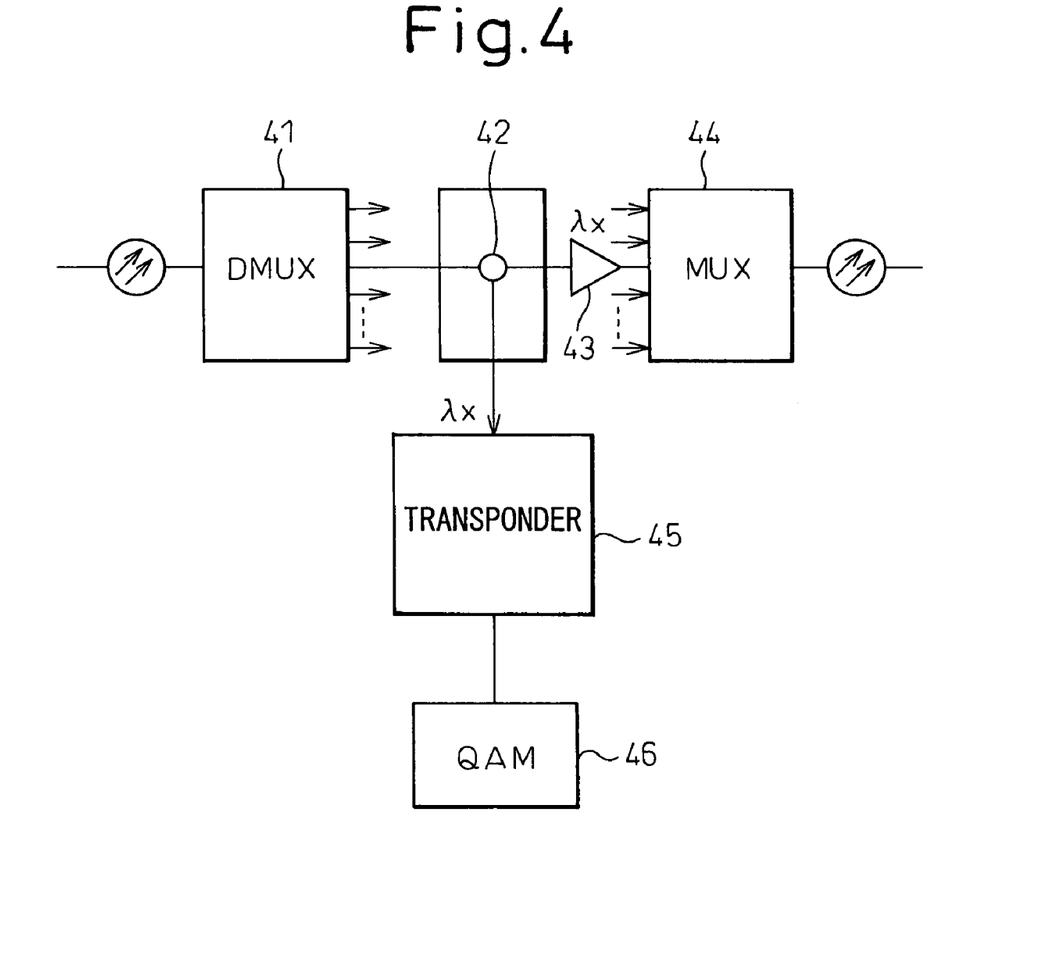
FIG. 4 is a block diagram of a system, showing one implementation example of a prior art drop-and-continue function that uses a Mux/Dmux type WDM according to the prior art.

FIG. 4 is a block diagram of a system, showing one implementation example of the drop-and-continue function that uses a Mux/Dmux type WDM according to the prior art. In the figure, reference numeral 41 is a wavelength division device (also called an optical demultiplexer or a DMUX) which separates multiplexed optical signals on a channel-by-channel basis according to the wavelength, 42 is a splitter which splits the optical signal of each channel output from the DMUX 41 into two parts, one to the end user side and the other to the WDM at the next stage, 43 is an amplifier which amplifies the output of the splitter 43, 44 is a multiplexing device (also called an optical multiplexer or a MUX) which multiplexes the output optical signal of the amplifier 43 with optical signals output from other amplifiers (not shown), 45 is a transponder which relays the optical signal separated by the splitter 42 and directed to the end user side, and 46 is a QAM which applies quadrature amplitude modulation to the output of the transponder 45 and passes the modulated signal to the end user side.

According to the prior art system shown in FIG. 4, with the optical splitter 42 inserted between the DMUX 41 and the MUX 44, an optical signal of wavelength λX can be dropped and the optical signal of the same wavelength λX can be transmitted to the next node.

Figure 5:
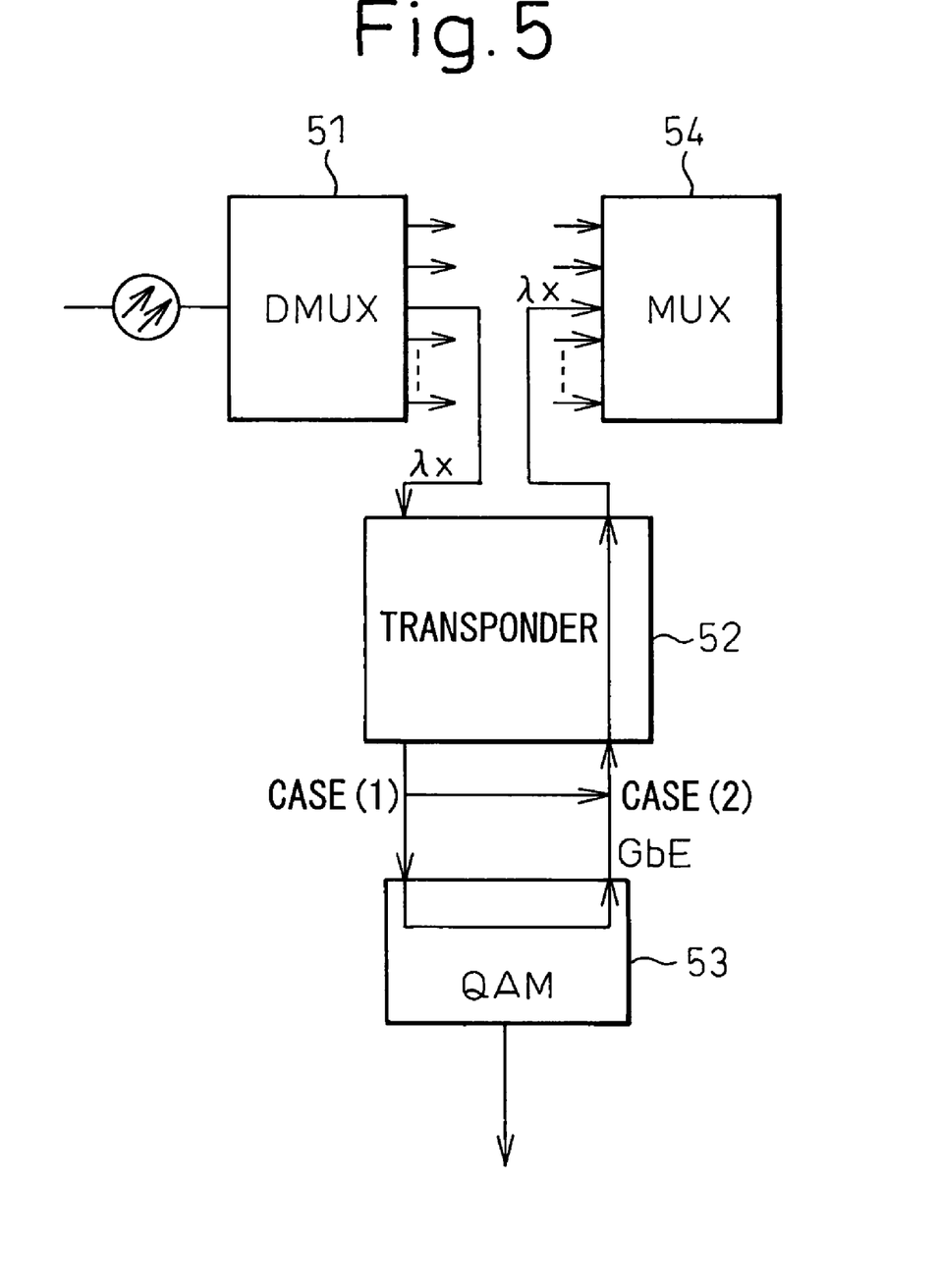
FIG. 5 is a block diagram of a system, showing another implementation example of the prior art drop-and-continue function that uses a Mux/Dmux type WDM according to the prior art.

FIG. 5 is a block diagram, of a system, showing another implementation example of the prior art drop-and-continue function that uses a Mux/Dmux type WDM according to the prior art. In the figure, reference numeral 51 is a wavelength division device (also called an optical demultiplexer or a DMUX) which separates multiplexed optical signals on a channel-by-channel basis according to the wavelength, 52 is a transponder which relays an optical signal output from the DMUX 51 to the end user side, 53 is a QAM which applies quadrature amplitude modulation to the output of the transponder 45 and passes the modulated signal to the end user side, and 54 is a wavelength multiplexing device (also called an optical multiplexer or a MUX) which receives, via the transponder 52, the optical signal looped back within the QAM or on the input side of the QAM and multiplexes the optical signal with optical signals from other transponders.

In FIG. 5, in the case of example (1), the signal output from the DMUX 51 and relayed via the transponder 52 is passed to the end user side, while the same signal is looped back within the QAM 53 and transferred via the transponder 52 to the MUX 54 for multiplexing.

In FIG. 5, in the case of example (2), the data (GbE) output from the transponder 52 is looped back before entering the QAM 53, and is transferred via the transponder 52 to the MUX 54 for multiplexing.

Figure 6:
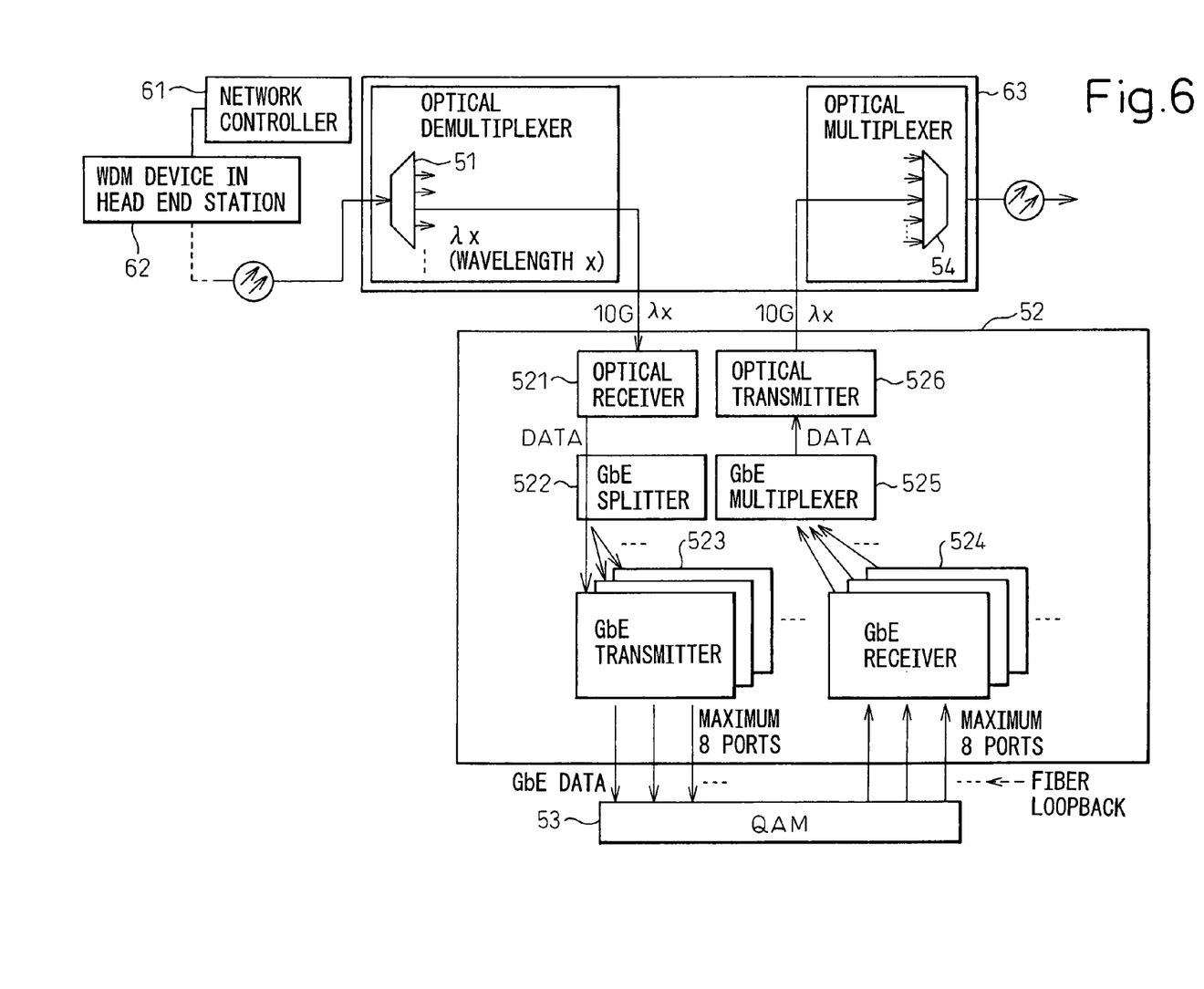
FIG. 6 is a block diagram showing in further detail the prior art system of FIG. 5 for the case of example (2)

FIG. 6 is a block diagram showing, in further detail, the prior art system of FIG. 5 in the case of example (2). In the figure, the same component elements as those in FIG. 5 are designated by the same reference numerals. Reference numeral 61 is a network controller, 62 is a WDM device in the head end station, and 63 is the existing WDM device in the distribution node. The transponder 52 comprises an optical receiver 521 which receives an optical signal, for example, of 10 gigabits from the DMUX 51 and converts it into an electrical signal, a Gigabit Ethernet (registered trademark) splitter 522 which splits the electrical signal into a maximum of eight ports of 1-gigabit signals, a GbE transmitter 523 which converts the maximum of eight pieces of split data into optical signals for transmission to the QAM 53, a GbE receiver 524 which receives the optical signals looped back from the QAM 53 and converts them into electrical signals, a GbE multiplexer 525 which multiplexes the maximum of eight pieces of data supplied from the GbE receiver 524, and an optical receiver 526 which receives the multiplexed data and converts it into an optical signal. As shown, a fiber loopback is performed within the QAM 53.

[Patent Document 1] Japanese Unexamined Patent Publication No. 2004-056685

[Patent Document 2] Japanese Unexamined Patent Publication No. H04-167634

[Patent Document 3] Japanese Unexamined Patent Publication No. H09-036834

In the prior art system shown in FIG. 4, which requires that the splitter 52 be inserted between the DMUX 41 and the MUX 44, the output level of the optical signal drops through the splitter 52; accordingly, the amplifier 43 must be inserted between the splitter 42 and the MUX 44 in order to adjust the output level. In the case of WDM, as the performance is determined by the worst wavelength of the multiplexed wavelengths, the amplifier must be inserted, for that wavelength, in order to compensate for the level drop. The insertion of the amplifier causes significant problems such as the degradation of OSNR (Optical Signal Noise Ratio) and the greatly increased equipment cost because of the need to provide the amplifier for each wavelength (i.e., for each channel). Therefore, in reality the system shown in FIG. 4 is hardly practicable.

The case (1) of FIG. 5 has the problem that the equipment configuration of the QAM is expensive, because the signal is looped back within the QAM 53. Furthermore, the transponder 52 must be fully equipped with circuits in both directions. This not only increases the failure rate, but also leads to a higher incidence of faults. A further problem is that it takes much labor to implement this function because an optical fiber or a cable has to be installed manually between the transponder 52 and the QAM 53 for each channel.

In the case (2) of FIG. 2, the output data (for example, GbE) of the transponder 52 is looped back, but this can only achieve the effect of omitting the loopback function in the QAM 53. In this case, a protocol for terminating the data (for example, GbE) and transmitting the data anew has to be handled within the transponder 52 and, hence, has the disadvantage that a new function has to be added to the transponder 52. Furthermore, since the data is looped back via a cable, there arises the problem that the work and management becomes complex.

Though not shown here, if the drop-and-continue function is not used at all, the same data will have to be broadcast via as many routes as there are distribution nodes, resulting in inefficient utilization of resources (wavelength, data, etc.). On the other hand, if the same resources (wavelength, data, etc.) are to be shared among them, one possible method would be to transmit the data at staggered intervals of time, but this would involve such problems as the work at each node increases because of signal route changing, etc. (or high-performance equipment such as DADM must be provided) and that there occurs a time difference (difference in quality) between the end users in delivering the service.

Figure 7:
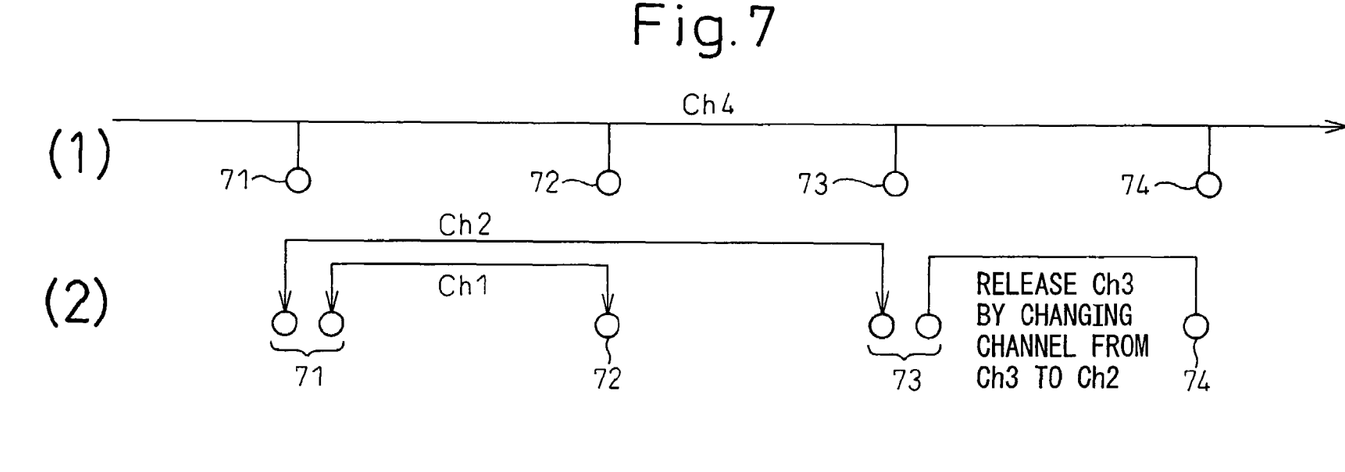
FIG. 7 is a diagram for explaining a further problem associated with the prior art systems shown in FIGS. 4 to 6.

FIG. 7 is a diagram for explaining a further problem associated with the prior art systems shown in FIGS. 4 to 6. In the figure, reference numerals 71 to 74 are terminals connected to the distribution nodes served by the head end station. For example, as shown in part (2) of the figure, it is assumed that channel Ch1 is used between the terminals 71 and 72, channel Ch2 between the terminals 71 and 73, and channel Ch3 between the terminals 73 and 74. In this situation, if data on channel Ch3, for example, is to be handled by the drop-and-continue function, as the channel Ch3 is used at the terminal 73, the channel Ch3 in use must be released, for example, by changing the channel from channel Ch3 to channel Ch2 in order to implement the drop-and-continue function. As a result, channel reallocation must be done at the terminals 73 and 74. As this can cause an interruption in service or an error can occur in the work of channel reallocation, there arises the problem that not only does the reliability drop but the maintenance cost increases due to the channel reallocation.

The drop-and-continue function can also be implemented by using a new channel Ch4 as shown in part (1) of the figure, but this has the problem that efficiency in wavelength utilization drops and equipment cost increases because of the increase in the number of channels.

SUMMARY OF THE INVENTION

To solve the above problems, according to a first mode of the present invention, there is provided a drop-and-continue device which is placed between a wavelength-division multiplexing device and a signal converter which supplies data and a signal to an end user, the drop-and-continue device characterized by the provision of: an optical receiver which converts an optical signal separated by an optical demultiplexer into an electrical signal; a transmitter which transmits the electrical signal to the end user via the signal converter in the form of either an electrical signal or an optical signal; an optical transmitter which supplies an optical signal to an optical multiplexer; and a loopback processor which loops the electrical signal output from the optical receiver back to the optical transmitter.

According to a second mode of the present invention, the optical transmitter includes a wavelength conversion means, thereby supplying to the optical multiplexer an optical signal of a wavelength different from the wavelength of the optical signal received by the optical receiver.

According to a third mode of the present invention, the drop-and-continue device further comprises a CPU interface which makes possible signal transmission and reception between the wavelength-division multiplexing device and the optical transmitter and Gigabit Ethernet (registered trademark) transmitter, thereby making it possible to remotely control the drop-and-continue device from a wavelength-division multiplexing device in a head end station.

According to the first mode of the present invention, as the electrical signal output from the optical receiver is looped back to the optical transmitter, there is no need to provide an amplifier for each channel; this serves to prevent the degradation of OSNR while also reducing the equipment cost, and thus offers the effect that the drop-and-continue function can be easily added onto the existing WDM device.

According to the second mode of the present invention, wavelength conversion is made possible by providing the optical transmitter with wavelength conversion means. As a result, an added value that makes wavelength conversion between WDMs possible can be provided, achieving an enhancement in the efficiency of the equipment of the entire network. In particular, in a recent WDM network which is required to handle a plurality of applications (services to be provided to the end user) within a single network, the allocation of data capacity and wavelengths among the nodes is the most important key to achieving the enhancement in the efficiency of the equipment, and the wavelength saving contributes to drastically reducing the equipment cost.

According to the third mode of the present invention, the CPU interface is provided and connected via a LAN or the like to the existing WDM device and, by sharing an OSC and an DCC, it becomes possible to perform operations from a remotely located network controller. This makes possible such operations as the manipulation of the wavelength in the wavelength conversion means and the detection of an alarm.

By implementing the above function on a stand-alone board, capabilities best suited for video and voice distribution can be easily provided as an add-on to any kind of Mux/Dmux type WDM device.

Furthermore, a new unit having such capabilities can be added to a transponder lineup and implemented as a part integrated into the Mux/Dmux type device.

DESCRIPTION OF THE PREFERRED EMBODIMENTS

Figure 8:
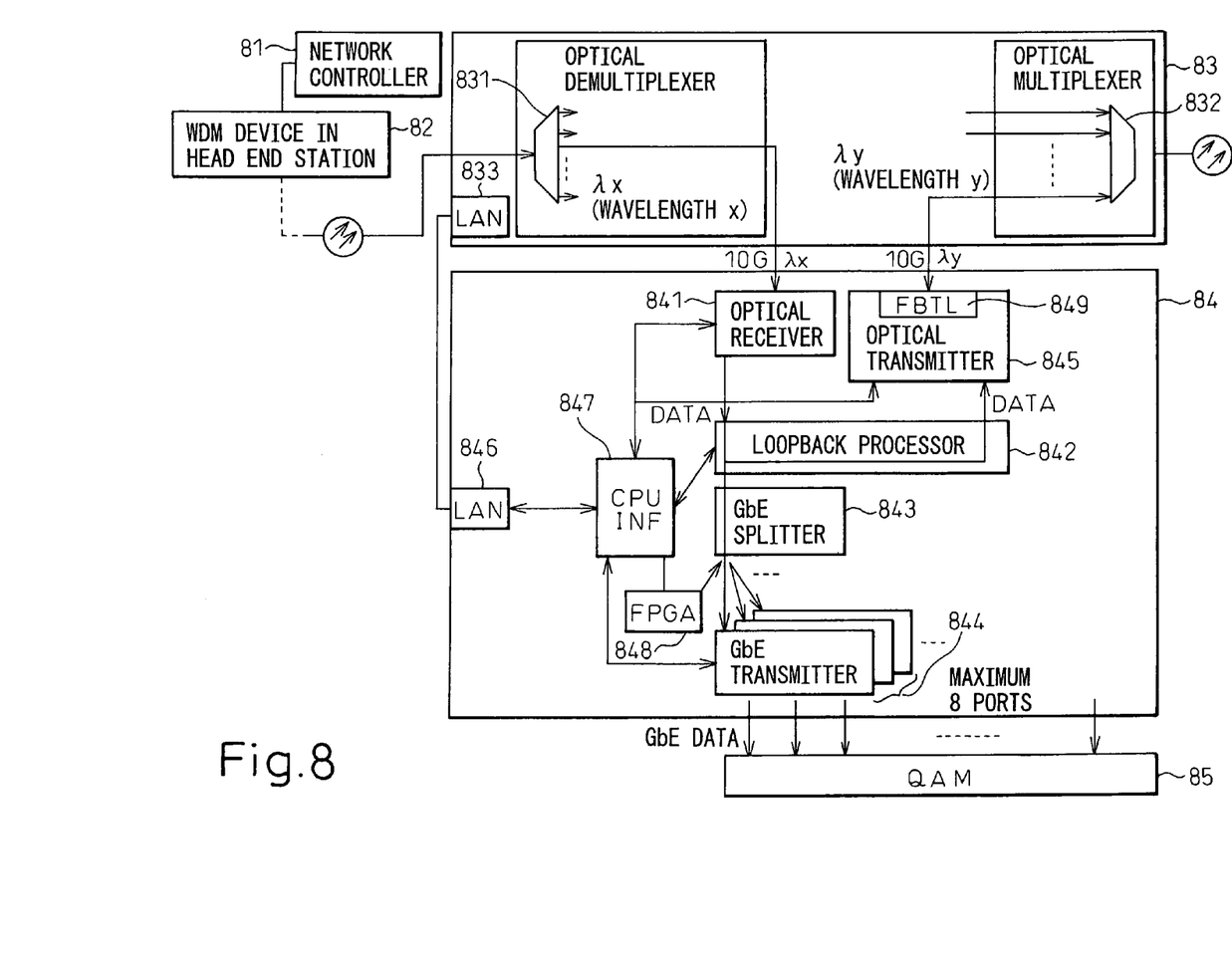
FIG. 8 is a block diagram showing the configuration of a stand-alone drop-and-continue device according to an embodiment of the present invention.

FIG. 8 is a block diagram showing the configuration of a stand-alone drop-and-continue device according to an embodiment of the present invention. In the figure, reference numeral 81 is a network controller, 82 is a WDM device in a head end station, 83 is an existing WDM device (also called a wavelength-division multiplexing device) in a distribution node, 84 is the drop-and-continue device installed in accordance with the embodiment of the present invention, and 85 is a quadrature amplitude modulator.

The WDM device 83 comprises a DMUX (also called an optical demultiplexer) 831 which demultiplexes the optical signal received from the head end 82 into optical signals, for example, of 10 gigabits, a MUX (also called an optical multiplexer) 832 which multiplexes the optical signal from the drop-and-continue device 84 with the optical signals output from drop-and-continue devices on other channels, and a LAN interface 833.

The drop-and-continue device 84 comprises an optical receiver 841 which receives an optical signal, for example, of 10 gigabits from the DMUX 831 and converts it into an electrical signal, a loopback processor 842 which loops back the electrical signal, a Gigabit Ethernet (registered trademark) splitter 843 which splits the output of the optical receiver 841 into a maximum of eight ports with 1 gigabit per port, a GbE transmitter 844 which converts the maximum of eight pieces of split data into optical signals for transmission to the QAM 85, an optical receiver 845 which receives the electrical signal data looped back by the loopback processor 842 and converts it into an optical signal, a LAN interface 846, a CPU interface 847, and an FPGA (Field Programmable Gate Array) 848.

The CPU interface 847 is connected to the optical receiver 841, the loopback processor 842, the GbE transmitter 844, the optical transmitter 845, and the LAN interface 846. The LAN interface 846 is connected to the LAN interface 833 in the WDM device 83.

In operation, the optical receiver 841 receives the 10-gigabit optical signal λX from the DMUX 831, and converts it into an electrical signal. The electrical signal is split by the GbE splitter 843 into a maximum of eight signals, while at the same time, the electrical signal is looped back by the loopback processor 842 and input to the optical transmitter 845.

The GbE splitter 843 breaks down the signal for conversion into optical or electrical data whichever data is requested by the client through the QAM 85, etc. and the converted data is transmitted by the GbE transmitter 844 toward the QAM 84. The signal looped back by the loopback processor 842 is converted, in accordance with control from the CPU interface 84, by an FBTL (Full Band Tunable Laser Diode) 849 in the optical transmitter 845 into an optical signal of wavelength λy for transmission.

The CPU interface 847 communicates with the WDM device 83 via the LAN interface 846 and, by sharing a DCC (Data Communication Channel) and an OSC (Optical Supervisor Channel), it becomes possible to remotely supervise and manage the drop-and-continue device 84 from the network controller 81.

The CPU interface 847 interfaces with the various blocks and performs the control and supervision functions.

The drop-and-continue device 84 can be implemented as a stand-alone device. In that case, it can be easily added onto any existing WDM device.

The drop-and-continue device 84 can also be added to a transponder unit lineup and implemented as a part integrated into the WDM device 83.

Figure 9:
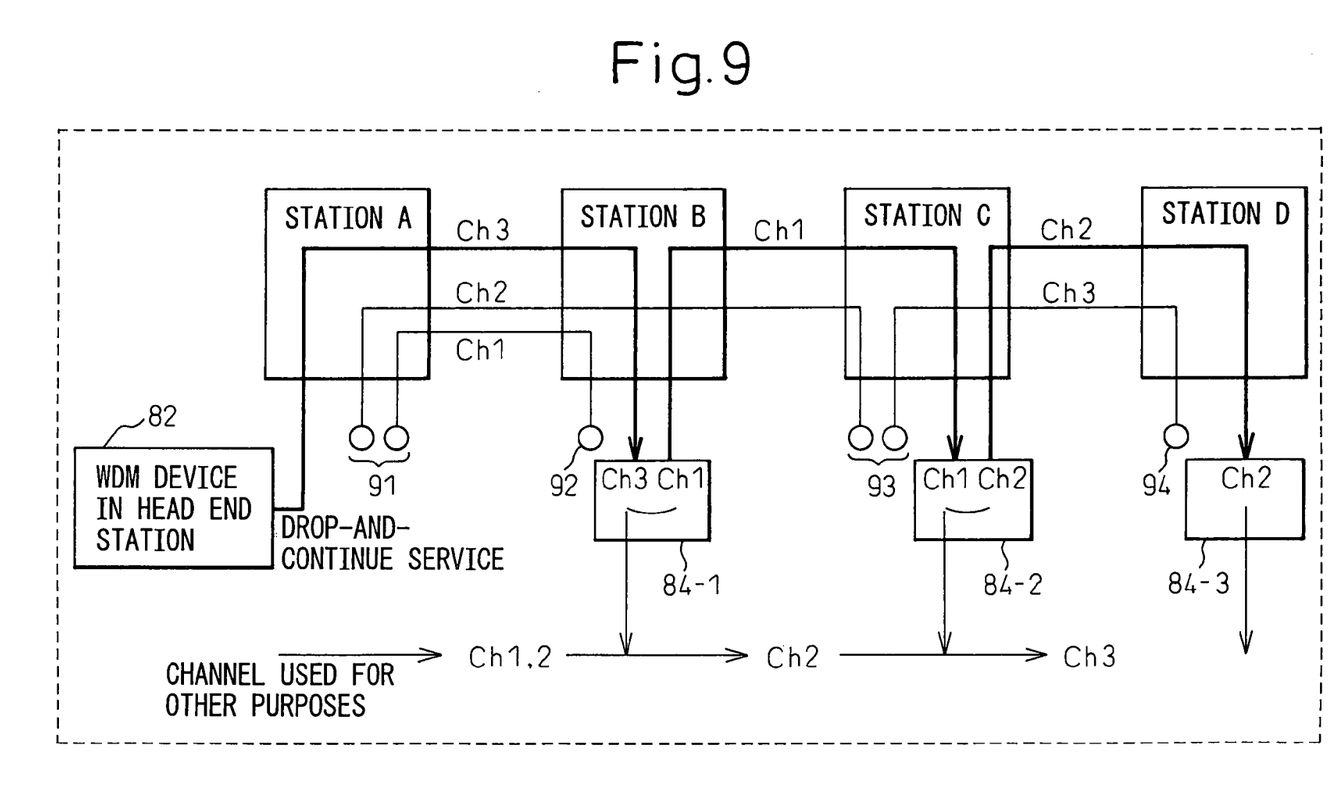
FIG. 9 is a diagram for explaining the effect achieved by the use of an FBTL (Full Band Tunable Laser Diode) 849 in FIG. 8 for implementing wavelength conversion.

FIG. 9 is a diagram for explaining the effect achieved by the use of the FBTL (Full Band Tunable Laser Diode) 849 in FIG. 8 for implementing the wavelength conversion. In the figure, the head end WDM device 82 serves the distribution nodes A, B, C, and D. It is assumed that channel Ch1 is used between a terminal 91 served by the distribution node A and a terminal 92 served by the distribution node B, channel Ch2 between a terminal 91 served by the distribution node A and a terminal 93 served by the distribution node C, and channel Ch3 between a terminal 93 served by the distribution node A and a terminal 94 served by the distribution node D. If the drop-and-continue function is to be added on in this condition, in the case of the prior art system using the transponder shown in FIG. 6, either a channel for the drop-and-continue has had to be secured by changing a channel already used for other purposes, or an unused channel has had to be used as the channel for the drop-and-continue.

In contrast, according to the embodiment of the present invention, between the distribution nodes A and B a channel not used for any other purpose, for example, channel Ch3, is used for the drop-and-continue and, between the distribution nodes B and C, a channel not used for any other purpose, for example, channel Ch1, is used for the drop-and-continue, while between the distribution nodes C and D, a channel not used for any other purpose, for example, channel Ch2, is used for the drop-and-continue. To achieve this, in the drop-and-continue device 84-1 the wavelength of the input optical signal on Ch3 is converted to the wavelength of the output optical signal on Ch1 and, in the drop-and-continue device 84-2, the wavelength of the input optical signal on Ch1 is converted to the wavelength of the output optical signal on Ch2. In this way, the drop-and-continue function can be implemented without changing the content of the looped back signal, though the channel is changed.

As described above, according to the embodiment of the present invention, when adding the drop-and-continue function to a cable television or video distribution network, wavelength allocation design can be done between the distribution nodes, eliminating the need for network-wide redesigning and achieving effective utilization of wavelengths.

The above embodiment has been described by taking as an example the case where the optical signal output from the DMUX 831 is a 10-gigabit signal which is split by the GbE splitter 843 into 1-gigabit optical signals, but the present invention is not limited to the illustrated example, and it will be appreciated that the wavelength of the optical signal output from the DMUX 831 is not limited to any particular wavelength, nor is the wavelength of each optical signal output from the GbE splitter 843 limited to any particular wavelength. Further, the GbE splitter 843 and the GbE transmitter may be replaced by a splitter and transmitter of another type. Furthermore, the electrical-to-optical conversion may be performed in the GbE splitter 843 or in the GbE transmitter 844. Moreover, the QAM 85 may be replaced by some other signal converter, for example, a SONET multiplexing device, that can convert the signal into a form acceptable to the end user terminal.

According to the present invention, there is provided a drop-and-continue device that can easily add capabilities best suited for video, voice, and entertainment distribution and other added value features (such as low cost, network optimization by wavelength conversion, and remote control and management) onto a Dmux/Mux type wavelength-division multiplexing (WDM) device. Furthermore, when adding the drop-and-continue function to a cable television or video distribution network, wavelength allocation design can be done between the distribution nodes, eliminating the need for network-wide redesigning and achieving effective utilization of wavelengths.

What is claimed is:

1. A drop-and-continue device provided between a signal converter which supplies data and a signal to an end user and a wavelength-division multiplexing device which comprises an optical demultiplexer separating an optical signal of a desired wavelength from an optical signal supplied from a wavelength-division multiplexing device in a head end station and an optical multiplexer supplying an optical signal to a wavelength-division multiplexing device at a subsequent stage, the drop-and-continue device comprising:
    an optical receiver which converts the optical signal separated by the optical demultiplexer into an electrical signal;
    a transmitter which transmits the electrical signal to the end user via the signal converter in the form of either an electrical signal or an optical signal;
    an optical transmitter which supplies an optical signal to the optical multiplexer; and
    a loopback processor which loops the electrical signal output from the optical receiver back to the optical transmitter.

2. The drop-and-continue device as claimed in claim 1, wherein the optical transmitter includes a wavelength conversion means, thereby supplying to the optical multiplexer an optical signal of a wavelength different from the wavelength of the optical signal received by the optical receiver.

3. The drop-and-continue device as claimed in claim 1, further comprising a CPU interface which makes possible signal transmission and reception between the optical transmitter, the transmitter, and the wavelength-division multiplexing device, thereby making it possible to remotely control the drop-and-continue device from the wavelength-division multiplexing device in the head end station.

* * * * *